(12) United States Patent
Bej

(10) Patent No.: US 7,278,690 B2
(45) Date of Patent: Oct. 9, 2007

(54) BACKREST FOR A VEHICLE SEAT

(76) Inventor: Mircea Bej, Faurecia Autositze GmbH & Co. KG Nordsehler Strasse 38, D-31655 Stadthagen (DE)

( * ) Notice: Subject to any disclaimer, the term of this patent is extended or adjusted under 35 U.S.C. 154(b) by 0 days.

(21) Appl. No.: 11/328,192

(22) Filed: Jan. 10, 2006

(65) Prior Publication Data

US 2006/0163932 A1 Jul. 27, 2006

(30) Foreign Application Priority Data

Jan. 27, 2005 (DE) ............ 10 2005 003 819

(51) Int. Cl.
 *B60R 22/28* (2006.01)
(52) U.S. Cl. ............................................ 297/410
(58) Field of Classification Search ............. 297/391, 297/410
 See application file for complete search history.

(56) References Cited

U.S. PATENT DOCUMENTS

| | | | |
|---|---|---|---|
| 4,111,483 A * | 9/1978 | Jaeger | 297/410 |
| 5,997,090 A | 12/1999 | Baloche et al. | |
| 6,056,364 A * | 5/2000 | De Filippo | 297/410 |
| 6,068,337 A * | 5/2000 | De Filippo | 297/391 |
| 6,260,924 B1 | 7/2001 | Jones et al. | |
| 2003/0107253 A1* | 6/2003 | Bartels | 297/410 |

FOREIGN PATENT DOCUMENTS

| DE | G 90 11 486.8 | 11/1990 |
|---|---|---|
| DE | 42 01 829 A1 | 6/1993 |
| DE | 44 00 911 A1 | 8/1994 |
| DE | 44 44 122 C1 | 4/1996 |
| DE | 196 35 740 A1 | 3/1997 |
| DE | 196 00 789 C2 | 7/1997 |
| DE | 297 07 562 U1 | 10/1997 |
| DE | 42 16 584 C2 | 7/1998 |

(Continued)

OTHER PUBLICATIONS

German Patent Office Action dated Mar. 22, 2005 in German Application No. 10 2004 049 191.7-74, filed Oct. 8, 2004 (2 pages).

(Continued)

*Primary Examiner*—Milton Nelson, Jr.
(74) *Attorney, Agent, or Firm*—Shlesinger, Arkwright & Garvey LLP

(57) ABSTRACT

Backrest for a vehicle seat with a height-adjustable headrest, which is adjusted by support rods guided inside the backrest frame, and which has ends of the support rods connected to one another by a crossbar having one or more radially biased retaining elements for retaining an end of one of the support rods, and a locking element provided for restricting movement of the retaining element. During assembly of the automobile seat, before upholstering, one of the stop-lock connections located between the support rods and the crossbar is locked by pushing a locking element up on the outside of the retaining element. The stop-lock connection is thus "frozen" to a certain extent. Once manufacturing of the automobile seat is completed, this stop-lock connection can be disengaged only by partially removing the upholstery, which for practical purposes excludes a removal of the headrests for day-to-day driving.

13 Claims, 4 Drawing Sheets

FOREIGN PATENT DOCUMENTS

| | | |
|---|---|---|
| DE | 197 13 753 C2 | 10/1998 |
| DE | 197 24 554 A1 | 12/1998 |
| DE | 198 82 413 T1 | 5/2000 |
| DE | 698 00 455 T2 | 6/2001 |
| DE | 103 01 283 B3 | 7/2001 |
| DE | 100 26 530 A1 | 12/2001 |
| DE | 101 42 981 A1 | 3/2003 |
| DE | 101 60 929 A1 | 7/2003 |
| DE | 102 30 637 A1 | 1/2004 |
| DE | 103 15 375 A1 | 11/2004 |
| EP | 0 901 934 A1 | 3/1999 |
| EP | 1 046 541 A1 | 10/2000 |
| JP | 2001097099 A | 4/2001 |
| WO | 99/38723 | 8/1999 |
| WO | 01/89875 A1 | 11/2001 |

OTHER PUBLICATIONS

German Office Action dated Mar. 10, 2005 in German Application No. 10 2004 045 988.6-42, filed, Sep. 22, 2004 (3 pages).

German Office Action dated Dec. 6, 2005 in German Application No. 10 2005 005 485.4, filed Feb. 4, 2005 (3 pages).

German Office Action dated Oct. 24, 2005 in German Application No. 10 2005 003 819.0-16, filed Jan. 27, 2005 (2 pages).

U.S. Appl. No. 11/213,738, filed Aug. 30, 2005.

U.S. Appl. No. 11/230,925, filed Sep. 21, 2005.

U.S. Appl. No. 11/238,963, filed Sep. 30, 2005.

U.S. Appl. No. 11/284,898, filed Nov. 23, 2005.

U.S. Appl. No. 11/299,747, filed Dec. 13, 2005.

U.S. Appl. No. 11/346,313, filed Feb. 3, 2006.

U.S. Appl. No. 10/358,326, filed Feb. 5, 2003.

* cited by examiner

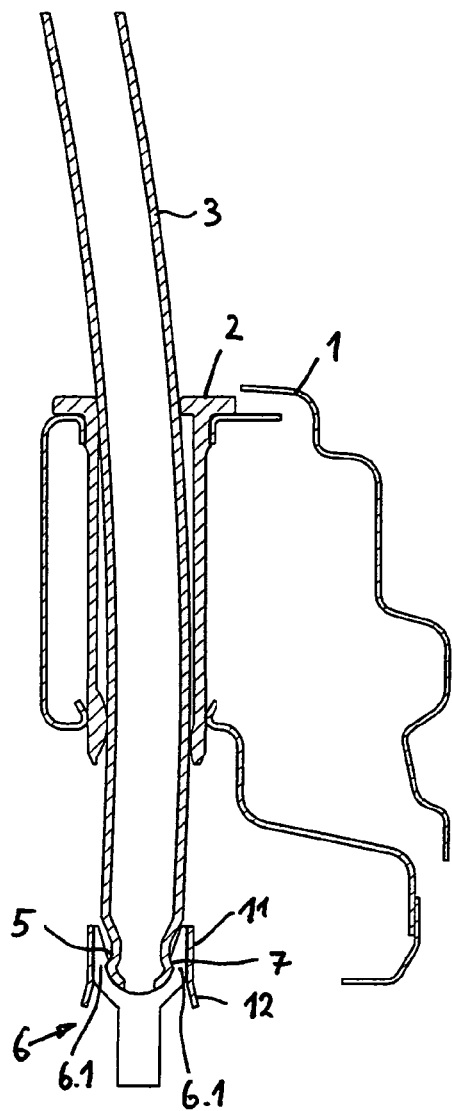
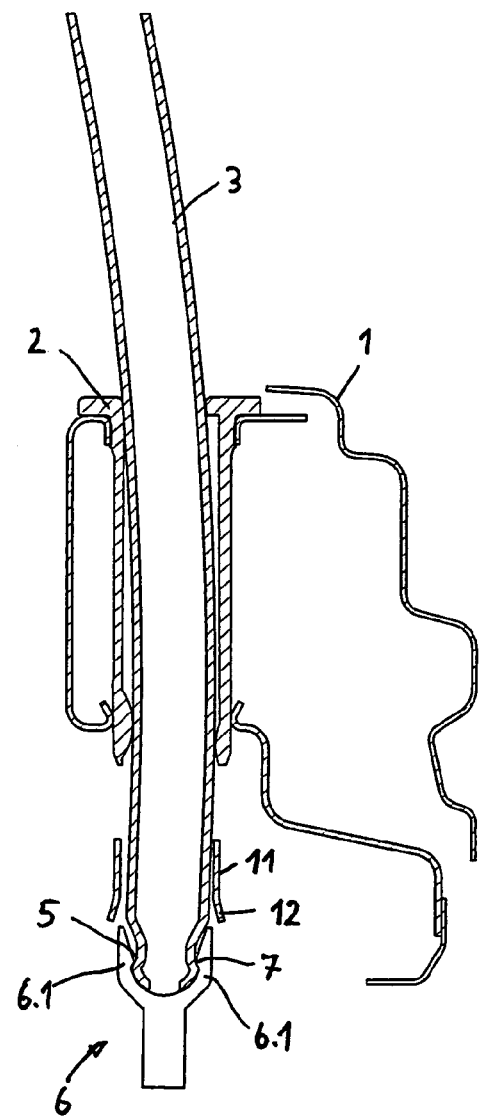
Fig.3
Fig.2

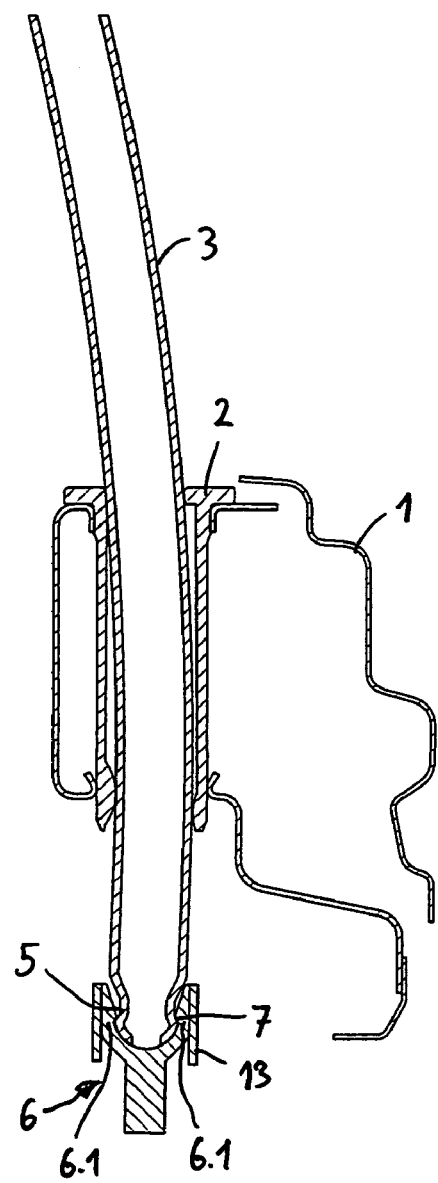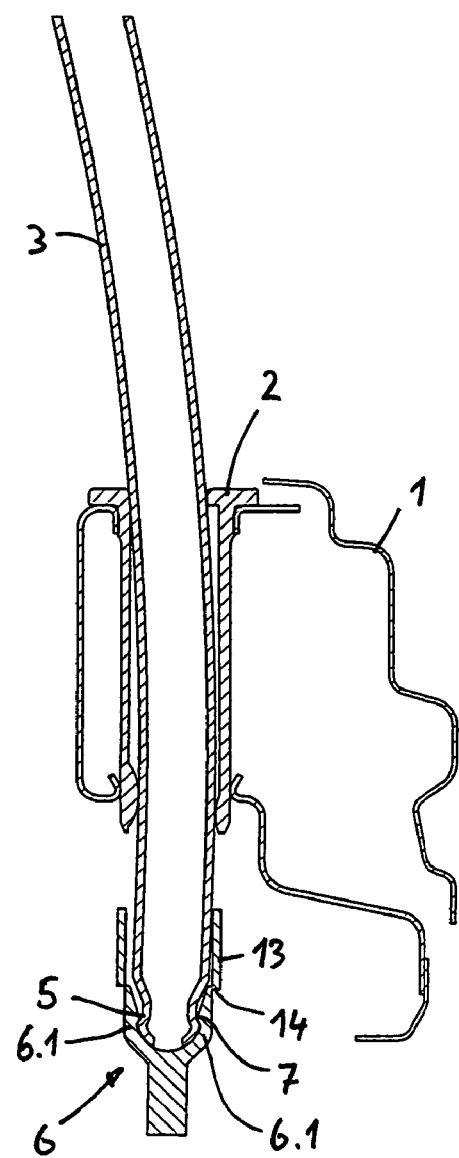
Fig. 6
Fig. 5

BACKREST FOR A VEHICLE SEAT

CROSS-REFERENCE TO RELATED APPLICATION

This application claims priority of German application no. 10 2005 003 819.0, filed Jan. 27, 2005, and which is incorporated herein by reference.

FIELD OF THE INVENTION

The invention relates to a backrest for a vehicle seat with a height-adjustable headrest that can be by adjusted by support rods guided inside the backrest frame. More particularly, the invention relates to a backrest for an automobile seat with a height-adjustable headrest which can be by adjusted by support rods guided inside the backrest frame, and which has ends of the support rods connected to one another via a crossbar which has retaining elements. Even more particularly, the invention relates to a backrest for an automobile seat with a height-adjustable headrest which can be by adjusted by support rods guided inside the backrest frame, and which has ends of the support rods connected to one another via a crossbar which has at least one radially biased retaining element for locking onto an end of one of the support rods, and a locking element provided for restricting movement of the retaining element.

BACKGROUND OF THE INVENTION

A backrest is known from DE 101 60 929 A1. The ends of the support rods for the headrest that extend into the backrest are connected to one another by a crossbar. These connections are designed as stop-lock connections, wherein one of the stop-lock connections can always be disengaged by applying the appropriate amount of pull, while the other stop-lock connection can be disengaged only by lifting a latch. The latter stop-lock connection has a z-shaped, bent leaf spring, which is positioned in a circumferential groove in the crossbar that encompasses a mounting opening for the support rod. When the support rod is pushed inward, the leaf springs yield elastically outward and then fall into two diametrically opposite notches that are equipped with locking surfaces for the stay bar and are arranged perpendicular to the direction of extension. In this position the headrest cannot be pulled out of the backrest. To allow this stop-lock connection to be disengaged, the support rod is rotatably mounted in the headrest. Furthermore, between the underside of the headrest and the upper surface of the backrest, unlocking surfaces for an open-ended wrench are provided. To disengage the stop-lock connection, the open-ended wrench is placed on the unlocking surfaces, and the support rod is rotated 90°. This frees the leaf springs from the notches in the stay bar and leaves them resting on its notchless; i.e., smooth circumferential area. The headrest can now be drawn upward out of the backrest.

The above-described construction is intended to prevent a headrest from being removed from a backrest, for example to improve the view toward the rear; in such cases it can be easy to forget to return the headrest to the backrest, leaving a passenger in the affected seat without the protection of a headrest.

A further backrest of this type is disclosed in DE 42 16 584 C2. However, with this backrest the stop-lock connection between the mounting devices and the support rods for the headrest are separable, so that the headrest can be removed from the backrest by a driver or passenger. This is precisely what the present invention seeks to prevent.

OBJECTS AND SUMMARY OF THE INVENTION

An object of the invention is overcome the drawbacks of the prior art.

Another object of the invention is to provide another type of backrests having headrests.

This object is achieved in accordance with the invention by a backrest for a vehicle seat with a height-adjustable headrest, which is adjusted by support rods guided inside the backrest frame, and which has ends of the support rods connected to one another by a crossbar having at least one radially biased retaining element for locking onto an end of one of the support rods, and a locking element provided for restricting movement of the retaining element.

According to the invention, during assembly of the vehicle seat, such as an automobile seat, before it is upholstered, for example, at least one of the stop-lock connections located between the support rods and the crossbar is locked. This is accomplished by pushing a locking element up on the outside of the retaining element, thus ensuring against radial expansion. The stop-lock connection is thus "frozen" to an extent. Once manufacturing of the automobile seat is complete, this stop-lock connection can be disengaged only by partially removing the upholstery, which for practical purposes excludes removal of the headrests for day-to-day driving.

Below, the invention will be described in greater detail with reference to exemplary embodiments.

Relative terms such as left, right, up, and down are for convenience only and are not intended to be limiting.

BRIEF DESCRIPTION OF THE DRAWINGS

FIG. 2 is a cross-section taken along line A-A of FIG. 1, FIG. 3 is a view as in FIG. 2, with the stop-lock connection locked, FIG. 5 is a cross-section taken along line B-B of FIG. 4, and FIG. 6 is a view as in FIG. 5 with the stop-lock connection locked.

DETAILED DESCRIPTION OF THE INVENTION

Figure 1:
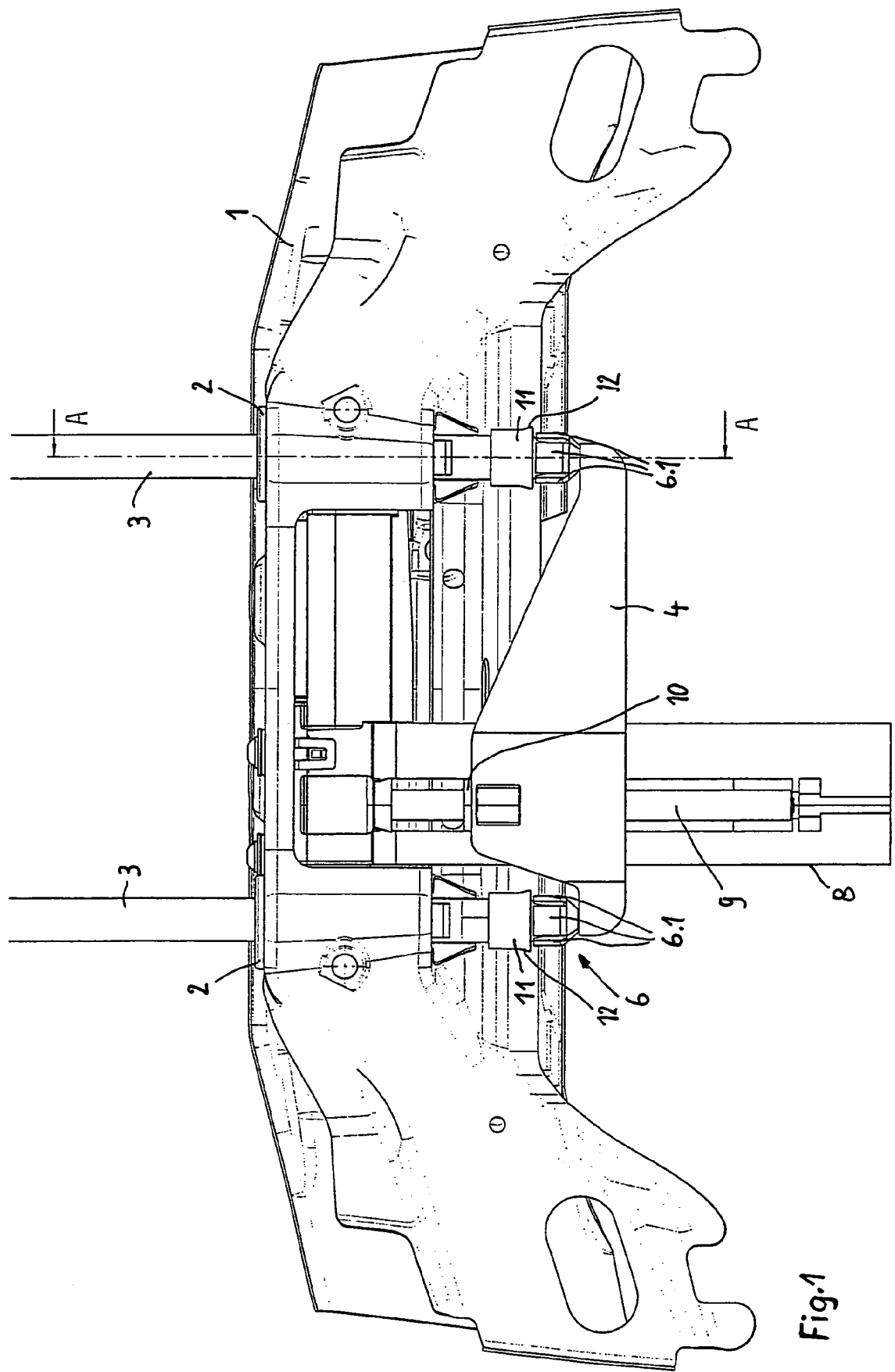
FIG. 1 is an upper transverse spar of a backrest frame with headrest support rods inserted into it, the lower ends of which are connected to a crossbar via stop-lock connections which are not yet locked, in accordance with an embodiment of the invention.

First, features that are common to the different embodiments of the invention shall be described. In this description, the same reference figures will be used to designate equivalent components.

An upper transverse spar 1 shown in the drawing of a backrest frame, which otherwise is not further illustrated, has two recessed guide bushings 2 made of plastic, spaced from one another, which hold one or more support rods 3 of a height-adjustable headrest that is omitted here. Lower ends of the support rods 3 are equipped with undercuts 5 for producing a stop-lock connection with a crossbar 4. As the counterpart to these undercuts 5, a retaining element 6 is provided at each end of the crossbar 4, which includes four retaining tongues 6.1 spaced evenly around the circumference of the support rod 3. These retaining tongues 6.1 are provided with one or more snap-in catches 7 on their inner sides. To produce the two stop-lock connections with the crossbar 4, the support rods 3 are pushed into the retaining elements 6 from above. This causes the retaining tongues 6.1 to extend elastically somewhat toward the outside, and then to latch with their snap-in catches 7 behind the undercuts 5 at the ends of the support rods 3.

The height of the headrest is adjusted electromechanically by way of a spindle drive 8, which is attached to the transverse spar 1. A spindle 9 of the spindle drive 8 extends in a spindle nut 10 that is non-rotatably connected to the crossbar 4. By actuating the spindle drive 8 in one or the other direction, the headrest can be raised or lowered. An adjusted height position for the headrest is held in place by the self-retention of the spindle drive 8.

The tensile forces that act against the stop-lock connections between the support rods 3 and the crossbar 4 as the headrest is lowered are reliably absorbed by the stop-lock connections. However, they cannot prevent the support rods 3 from being manually pulled out of the transverse spar 1 to remove the headrest from the automobile seat, because in that case the tensile forces acting on the stop-lock connections would be too great. Thus to prevent the headrest from being removed from the automobile seat a locking of the stop-lock connections is provided, which will be described below.

In the exemplary embodiment of FIGS. 1-3, the locking is accomplished using a sliding collar 11 made of steel, which forms a separate component. One end of this sliding collar 11 is equipped with a widened area 12. Before the stop-lock connections are established; i.e., engaged, the sliding collars 11 are slid onto the support rods 3, with their widened ends 12 pointing toward the ends of the support rods 3. Subsequently, the ends of the support rods 3, with the sliding collars 11 slid onto them, as described above, are secured to the retaining elements 6 of the crossbar 4, and the sliding collars 11 are pressed onto the outer surfaces of the retaining tongues 6.1, as is shown in FIG. 3, using a suitable tool. The widened ends 12 of the sliding collars 11 facilitate their being pressed onto the retaining elements 6. The sliding collars 11 that clamp around the retaining tongues 6.1 prevent the retaining tongues 6.1 from expanding outward, so that the established stop-lock connection is locked. Undoing of this locked connection can be accomplished only if a portion of the upholstery of the automobile seat is removed and the sliding collars 11 are slid upward from the retaining elements 6 using the proper tool. Thus removal of the headrests from the automobile seat under normal operating conditions is impossible.

Figure 4:
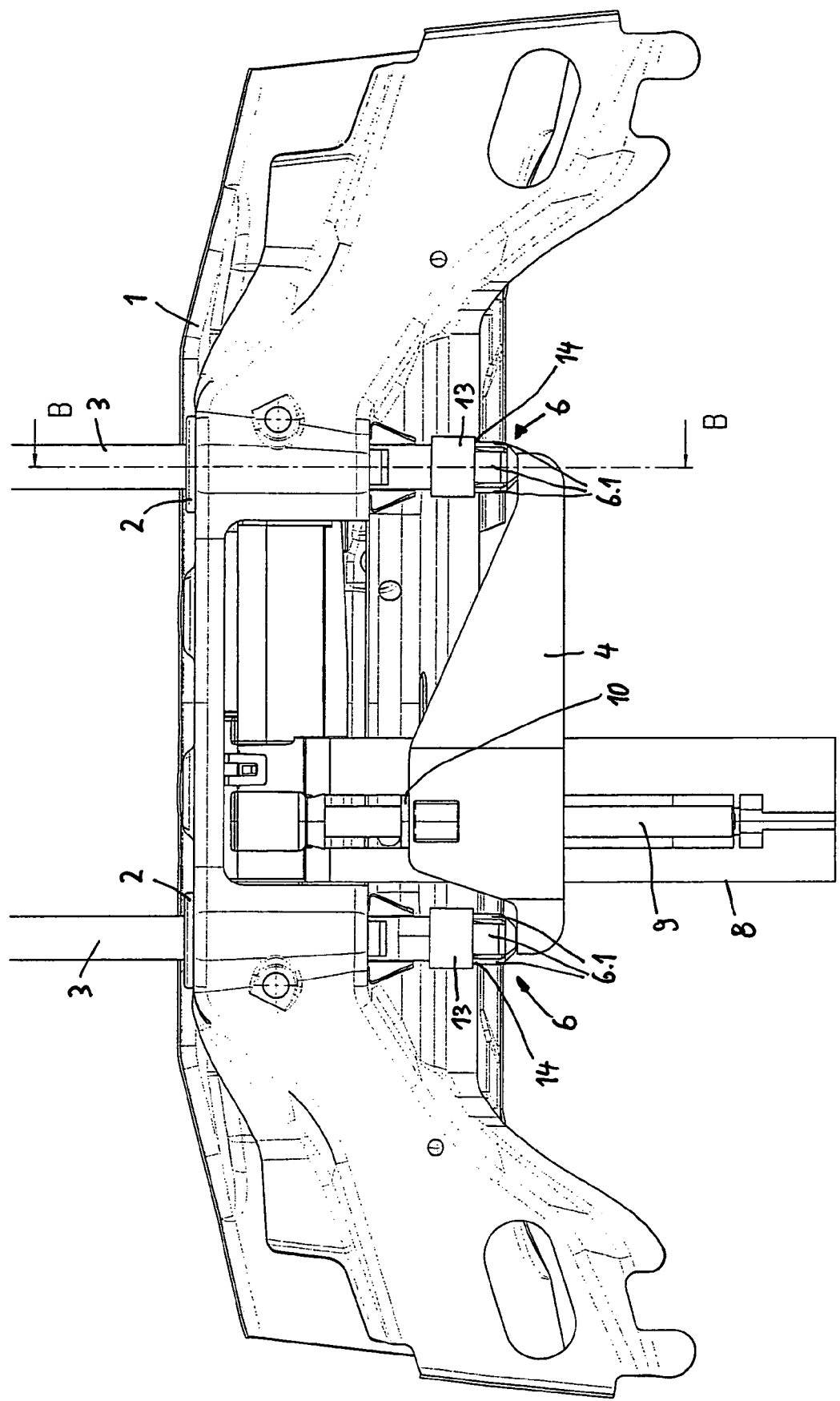
FIG. 4 is the upper transverse spar of a backrest frame with headrest support rods inserted into it, the lower ends of which are connected to a crossbar via stop-lock connections that are not yet locked, in accordance with another embodiment of the invention.

In the exemplary embodiment of FIGS. 4-6, a sliding collar 13 is made of plastic and is connected to the retaining tongues 6.1 as a single component by use of a film hinge 14. This embodiment has an advantage that the sliding collar 13 need not be provided as a separate component, which thus facilitates the assembly. To lock the stop-lock connections, the ends of the support rods 3 are inserted through the sliding collars 13 and latched to the retaining elements 6. The sliding collars 13 are then moved, by being pushed downward, using a suitable tool. This causes the film hinges 14 to break, and the sliding collars 13 can be pushed onto the outside of their respective retaining tongues 6.1, as is shown in FIG. 6. Using the film hinges 14 causes the inner surfaces of the sliding collars 13 to be oriented precisely on the outer surfaces of the retaining elements 6, so that a widened area designed to facilitate the pressing of the sliding collar 13 onto the retaining element 6, as in the preceding exemplary embodiment, can be omitted.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. A backrest for a vehicle seat, comprising:
   a) a height-adjustable headrest;
   b) a backrest frame having guides;
   c) two support rods provided on the headrest, extending into, and guided by the guides of the backrest frame;
   d) a crossbar connecting respective ends of the two support rods extending into the backrest frame;
   e) a stop-lock connection including a retaining element which is radially biased and which is configured for engaging and retaining the end of at least one of the two support rods for preventing movement of the at least one support rod;
   f) a locking element provided adjacent the stop-lock connection, the locking element being configured for engaging the retaining element, radially restricting movement of the retaining element, and for preventing unlocking of the stop-lock connection;
   g) upholstery provided on the backrest; and
   h) unlocking of the stop-lock connection can be accomplished only if a portion of the upholstery provided on the backrest is removed, the locking element is disengaged from the retaining element, and the stop-lock connection is unlocked for allowing movement of the at least one support rod for allowing removal of the at least one support rod.

2. Backrest as in claim 1, wherein:
   a) the crossbar and the retaining element include plastic; and
   b) the retaining element includes retaining tongues positioned around the support rod.

3. Backrest as in claim 2, wherein:
   a) the locking element includes a collar.

4. Backrest as in claim 3, wherein:
   a) before the collar is pushed on at its end nearest the retaining tongues, it is attached as a single unit to ends of the retaining tongues by a film hinge.

5. Backrest as in claim 1, wherein:
   a) the retaining element includes retaining tongues;
   b) the locking element includes a collar movable relative to the at least one rod and the retaining tongues; and
   c) a film hinge connects the retaining tongues and the collar before the collar is moved relative to the at least one rod and retaining tongues, and after the collar is moved relative to the at least one rod and retaining tongues, the film hinge is broken, the collar engages the retaining tongues, and the collar prevents movement of the retaining tongues.

6. Backrest as in claim 1, wherein:
a) the locking element includes a collar.

7. Backrest as in claim 1, wherein:
a) the retaining element includes retaining tongues;
b) the locking element includes a collar; and
c) an end of the collar nearest the retaining tongues includes a widened area.

8. Backrest as in claim 1, wherein:
a) the locking element includes a collar, and the collar includes steel.

9. Backrest as in claim 1, wherein:
a) the crossbar and the retaining element include plastic; and
b) the retaining element includes retaining tongues positioned around a circumference of the support rod.

10. A backrest for a vehicle seat, comprising:
a) a height-adjustable headrest;
b) a backrest frame having guides;
c) two support rods provided on the headrest, extending into, and guided by the guides of the backrest frame;
d) a crossbar connecting respective ends of the two support rods extending into the backrest frame;
e) a stop-lock connection including a retaining element which is radially biased and which is configured for engaging and retaining the end of at least one of the two support rods for preventing movement of the at least one support rod;
f) a locking element provided adjacent the stop-lock connection, the locking element being configured for engaging the retaining element, radially restricting movement of the retaining element, and for preventing unlocking of the stop-lock connection;
g) the locking element including a collar;
h) the retaining element including retaining tongues;
i) upholstery is provided on the backrest; and
j) unlocking of the stop-lock connection can be accomplished only if a portion of the upholstery provided on the backrest is removed, the locking element is disengaged from the retaining element, and the stop-lock connection is unlocked for allowing movement of the at least one support rod for allowing removal of the at least one support rod.

11. Backrest as in claim 10, wherein:
a) an end of the collar nearest the retaining tongues includes a widened area.

12. Backrest as in claim 10, wherein:
a) before the collar is pushed on at its end nearest the retaining tongues, it is attached as a single unit to ends of the retaining tongues by a film hinge.

13. Backrest as in claim 10, wherein:
a) the collar is movable relative to the at least one rod and the retaining tongues.

* * * * *